Figure 1:
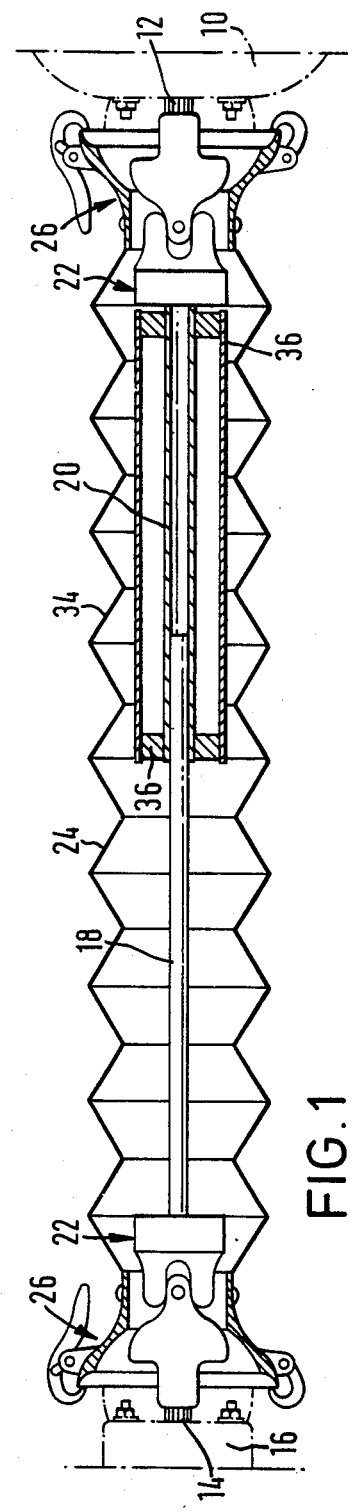

# United States Patent [19]

Taylor

[11] Patent Number: 4,663,984

[45] Date of Patent: May 12, 1987

[54] SAFETY GUARD FOR POWER-TAKE-OFF SHAFT

[76] Inventor: William Taylor, 58 Letterloan Road, Mascosquin, Coleraine, County Londonberry, Northern Ireland

[21] Appl. No.: 804,315

[22] Filed: Dec. 3, 1985

Related U.S. Application Data

[63] Continuation of Ser. No. 463,847, Feb. 4, 1983, abandoned.

[30] Foreign Application Priority Data

Feb. 5, 1982 [GB] United Kingdom ............... 8203439

[51] Int. Cl.⁴ ..................... F16P 1/00; G05G 25/00
[52] U.S. Cl. ................................ 74/608; 74/609; 464/173; 464/175
[58] Field of Search ............... 74/608, 609; 464/173, 464/175, 177

[56] References Cited

U.S. PATENT DOCUMENTS

| | | | |
|---|---|---|---|
| 2,903,840 | 9/1959 | Teupel et al. | 74/608 |
| 2,976,703 | 3/1961 | Atkinson | 464/175 |
| 3,797,328 | 3/1974 | Quirk | 74/609 |
| 3,866,440 | 2/1975 | Stananought | 464/175 |
| 4,114,529 | 9/1978 | Furmuga | 74/608 |

FOREIGN PATENT DOCUMENTS

| | | | |
|---|---|---|---|
| 2154839 | 11/1971 | Fed. Rep. of Germany | 74/609 |
| 920362 | 3/1963 | United Kingdom | 74/609 |
| 2045884 | 11/1980 | United Kingdom | 74/608 |

Primary Examiner—Gary L. Smith
Assistant Examiner—Michael F. Trettel
Attorney, Agent, or Firm—Gerald J. Ferguson, Jr.; Michael P. Hoffman; Ronni S. Malamud

[57] ABSTRACT

A guard for a power transmission shaft such as a tractor pto shaft 18,20 comprises a flexible convoluted tubing 24 with end couplings 26 which together totally enclose the rotating parts. The tubing 24 can extend and retract axially to suit a variety of shaft lengths, and can flex transversely to accommodate turning of the tractor/implement combination. A tube 34 journalled on bearings 36, or equivalent bearing means, prevents damage to the tubing 24 by the shaft 18,20.

3 Claims, 2 Drawing Figures

SAFETY GUARD FOR POWER-TAKE-OFF SHAFT

This application is a continuation Ser. No. 463,847, filed Feb. 4, 1983, now abandoned.

DESCRIPTION

This invention relates to a safety guard which is particularly, but not exclusively, suitable for use with the power-take-off (pto) shaft between an agricultural tractor and a towed implement.

The current general practice is to provide a generally cylindrical shield which covers most of the pto shaft, but does not extend over the couplings at its ends which are guarded by shields of inverted U-shape on the tractor and implement. Thus the pto system is not fully enclosed, and accidents occur for example by loose clothing falling through a gap between shields and becoming caught. Also, existing shields tend to become damaged in use, and are frequently removed by users.

Various proposals have been made for improved safety guards. Reference is particularly made to two prior proposals. In GB-A-799,402 there is shown a guard made of reinforced flexible convoluted tubing; however this is not totally enclosed at its ends, and no provision is made for mitigating wear of the tubing caused by its rubbing on the rotating shaft. FR-A-1,208,959 shows a guard which completely encloses the pto shaft and couplings, but the guard is rigid and a complex arrangement is required to allow it to follow movement of the shaft on relative turning between the tractor and implement.

In accordance with the present invention, there is provided a guard for a power transmission shaft between a prime mover and a powered accessory whose orientation with respect to the prime mover may change, the guard comprising a flexible tubular member capable of axial extension and retraction and capable of axial bending but resistant to radial compression, and coupling means on each end of the tubular member adapted for attachment to the prime mover and the accessory respectively, the coupling means when so attached causing the rotating parts to be totally enclosed.

The tubular member is preferably of convoluted rubberised cloth reinforced with steel wire.

Preferably, a bearing means is arranged between the tubular member and a shaft therethrough. In a preferred form the bearing means comprises a metal tube carried by bearings at its ends journalled on said shaft. As an alternative, bearings may be secured at the innermost points of the convolutions of the tubular member.

An embodiment of the invention will now be described, by way of example, with reference to the accompanying drawings, in which:-

Figure 2:
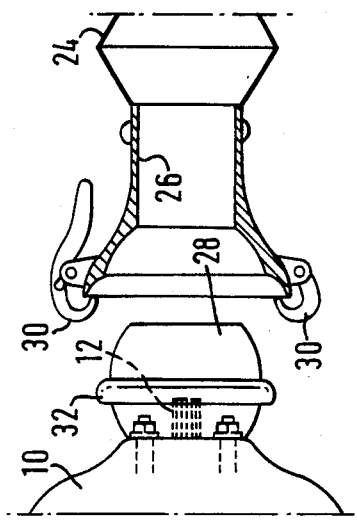

FIG. 1 is a diagrammatic cross-section of apparatus according to the invention; and Fig. 2 a similar view of one end of the apparatus in disassembled condition.

Referring to FIG. 1, a tractor 10 has a splined pot 12 coupled to a splined power input 14 of an implement 16 via a pto shaft. As is conventional, the pto shaft comprises telescopic shaft parts 18,20 and universal joints 22, the parts 18,20 being telescopic to accommodate relative movement between the tractor 10 and implement 16 when turning or traversing bumpy ground.

In accordance with the invention, the pto shaft 18-22 is totally enclosed by a guard comprising a flexible tube 24 and quick-release end couplings 26. The tube 24 is of convoluted form, made of rubberised cloth reinforced with steel wire. The tube 24 is capable of bending in any direction and of extending and retracting in length, but is resistant to inward deformation.

As best seen in FIG. 2, the end couplings 26 cooperate with part-spherical housings 28 secured to the tractor and implement in place of the conventional inverted-U guards. Hook-shaped clamps 30 cooperate with a raised lip 32 on the housing 28 to secure the coupling 26 in place. Larger couplings may be used, for example where an over-run clutch is fitted at the pto.

Returning to FIG. 1, a metal tube 34 is freely rotatable on the pto shaft part 20 by means of end bearings 36. Thus, if the flexible tube 24 is forced towards the pto shaft, the tube 24 will contact the metal tube 34 which will stand stationary while the shaft 18,20 rotates within it; this minimises wear on the flexible tube 24. As an alternative (not illustrated), some form of bearing surface could be fitted to the inner face of the tube, for example in the form of bearings or hardened rubber secured at the inner diameters of the convolutions (in practice, these need only be provided in the central area of the tube 24), or the tube 24 itself may be hardened in this area.

It will be appreciated that the guard of the invention totally encloses the pto mechanism, and thus makes it impossible for a person to be inadvertently caught in the rotating parts. The guard has other advantages:

- It can be used in a standard form with transmissions of different lengths
- Only one guard per tractor is needed, rather than one per implement
- The guard is easily opened for lubrication and maintenance.

Although described with reference to tractor/implement pto's, the present invention can be used with other forms of machinery.

I claim:

1. A guard for a power transmission shaft between flexible joints on, respectively, a prime mover and a powered accessory whose orientation with respect to said prime mover may change, said guard comprising:
   a flexible member capable of axial bending but restant to axial compression;
   bearing means within said tubular member for engagement between the shaft and the tubular member only when said tubular member undergoes axial bending; and
   coupling means on each of said tubular member for attaching to said prime mover and said accessory respectively, said coupling means when so attached causing said shaft and said flexible joints to be totally enclosed, said tubular member being capable of axial extension and retraction so as to adjust to any length of shaft within a range of lengths when said coupling means are attached.

2. The guard of claim 1, in which said bearing means comprises a metal tube carried by bearings at each end journalled on said shaft, the outer diameter of said tube being less than the inner diameter of said tubular member.

3. A guard for a power transmission shaft between flexible joints on, respectively, a prime mover and a powered accessory whose orientation with respect to said prime mover may change, said guard comprising:
   a flexible tubular member capable of axial bending but resistant to axial compression;

bearing means within said tubular member for engagement between the shaft and the tubular member only when said tubular member undergoes axial bending; and coupling means on each end of said tubular member for attaching to said prime mover and said accessory respectively, said coupling means when so attached causing said shaft and said flexible joints to be totally enclosed;

said tubular member being capable of axial extension of lengths when said coupling means are attached and said bearing means comprising a metal tube carried by bearings at each end journalled on said shaft.

* * * * *